US007648946B2

(12) United States Patent
Munoz, Jr.

(10) Patent No.: US 7,648,946 B2
(45) **Date of Patent: *Jan. 19, 2010**

(54) METHODS OF DEGRADING FILTER CAKES IN SUBTERRANEAN FORMATIONS

(75) Inventor: Trinidad Munoz, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 315 days.

This patent is subject to a terminal disclaimer.

(21) Appl. No.: 10/991,228

(22) Filed: Nov. 17, 2004

(65) Prior Publication Data

US 2006/0105918 A1 May 18, 2006

(51) Int. Cl.
*E21B 43/16* (2006.01)
*C09K 8/035* (2006.01)
*C09K 8/08* (2006.01)

(52) U.S. Cl. .................... 507/110; 166/244.1; 166/268; 166/270; 175/65; 507/112; 507/114

(58) Field of Classification Search ................. 507/110, 507/112, 114; 166/244.1, 268, 270; 175/65
See application file for complete search history.

(56) References Cited

U.S. PATENT DOCUMENTS 2,238,671 A 4/1941 Woodhouse ................. 166/21
2,703,316 A 3/1955 Palmer ...................... 260/78.3
3,173,484 A 3/1965 Huitt et al. ............... 166/280.1
3,195,635 A 7/1965 Fast ........................ 166/280.1
3,272,650 A 9/1966 MacVittie ...................... 134/7
3,302,719 A 2/1967 Fischer .................... 166/280.2
3,364,995 A 1/1968 Atkins et al. ............. 166/280.1
3,366,178 A 1/1968 Malone et al. ........... 166/280.1
3,455,390 A 7/1969 Gallus ........................ 166/295
3,784,585 A 1/1974 Schmitt et al. .............. 260/861
3,819,525 A 6/1974 Hattenbrun ................. 252/132
3,828,854 A 8/1974 Templeton et al. .......... 166/307
3,836,465 A 9/1974 Rhudy et al.
3,868,998 A 3/1975 Lybarger et al. ............ 166/278
3,912,692 A 10/1975 Casey et al. ................ 260/78.3
3,948,672 A 4/1976 Harnsberger ................. 106/90
3,955,993 A 5/1976 Curtice et al. ................. 106/90
3,960,736 A 6/1976 Free et al. ............... 252/8.55 R
3,968,840 A 7/1976 Tate ........................ 166/280.1
3,986,355 A 10/1976 Klaeger
3,998,272 A 12/1976 Maly .......................... 166/281
3,998,744 A 12/1976 Arnold et al. ............... 507/269
4,010,071 A 3/1977 Colegrove
4,068,718 A 1/1978 Cooke, Jr. et al. ........ 166/280.2
4,169,798 A 10/1979 DeMartino ............. 252/8.55 R
4,172,066 A 10/1979 Zweigle et al. ....... 260/29.6 TA
4,261,421 A 4/1981 Watanabe ................... 166/281
4,265,673 A 5/1981 Pace et al.
4,299,825 A 11/1981 Lee
4,387,769 A 6/1983 Erbstoesser et al. ......... 166/295
4,460,052 A 7/1984 Gockel ....................... 175/72
4,470,915 A 9/1984 Conway ................ 252/8.55 R
4,498,995 A 2/1985 Gockel .................. 252/8.5 LC
4,502,540 A 3/1985 Byham
4,506,734 A 3/1985 Nolte
4,521,316 A 6/1985 Sikorski
4,526,695 A 7/1985 Erbstoesser et al. ..... 252/8.55 R
4,632,876 A 12/1986 Laird et al.
4,694,905 A 9/1987 Armbruster ................. 166/280
4,715,967 A 12/1987 Bellis ...................... 252/8.551
4,716,964 A 1/1988 Erbstoesser et al. ......... 166/284
4,767,706 A * 8/1988 Levesque et al. ............ 435/176
4,772,346 A 9/1988 Anderson et al.
4,785,884 A 11/1988 Armbruster ................. 166/280
4,793,416 A 12/1988 Mitchell
4,797,262 A 1/1989 Dewitz ....................... 422/142
4,809,783 A 3/1989 Hollenbeck et al. ......... 166/307
4,817,721 A 4/1989 Pober ......................... 166/295
4,822,500 A 4/1989 Dobson, Jr. et al.
4,829,100 A 5/1989 Murphey et al.
4,836,940 A 6/1989 Alexander (Continued)

FOREIGN PATENT DOCUMENTS

EP 0 510 762 A2 4/1992

(Continued)

OTHER PUBLICATIONS

Simmons, et al., *Poly(phenyllactide): Synthesis, Characterization, and Hydrolytic Degradation*, Biomacromolecules, vol. 2, No. 2, 2001 (pp. 658-663).

(Continued)

*Primary Examiner*—Timothy J. Kugel
(74) *Attorney, Agent, or Firm*—Robert A. Kent; Baker Botts LLP

(57) ABSTRACT

Methods of degrading filter cakes in subterranean formations are provided. An example of a method is a method of drilling a well bore in a subterranean formation. Another example of a method is a method of degrading a filter cake in a subterranean formation, the filter cake comprising an inorganic portion and an organic portion, and having been established in the formation by a well drill-in and servicing fluid that comprises a delayed-release acid component. An example of a composition is a well drill-in and servicing fluid.

26 Claims, No Drawings

U.S. PATENT DOCUMENTS 4,843,118 A 6/1989 Lai et al. .................... 524/555
4,848,467 A 7/1989 Cantu et al. ................. 166/281
4,863,980 A 9/1989 Cowan et al.
4,886,354 A 12/1989 Welch et al. .................. 356/70
4,894,231 A 1/1990 Moreau et al.
4,957,165 A 9/1990 Cantu et al. ................. 166/295
4,961,466 A 10/1990 Himes et al. ................ 166/250
4,986,353 A 1/1991 Clark et al. ................. 166/279
4,986,354 A 1/1991 Cantu et al. ................. 166/279
4,986,355 A 1/1991 Casad et al. ................ 166/295
5,034,139 A 7/1991 Reid et al.
5,082,056 A 1/1992 Tackett, Jr. .................. 166/295
5,142,023 A 8/1992 Gruber et al. ............... 528/354
5,152,781 A 10/1992 Tang et al.
5,161,615 A 11/1992 Hutchins et al.
5,203,834 A 4/1993 Hutchins et al.
5,213,446 A 5/1993 Dovan
5,216,050 A 6/1993 Sinclair ...................... 524/108
5,247,059 A 9/1993 Gruber et al. ............... 528/354
5,249,628 A 10/1993 Surjaatmadja .............. 166/305
5,251,697 A 10/1993 Shuler
5,295,542 A 3/1994 Cole et al. .................. 166/278
5,304,620 A 4/1994 Holtmyer et al.
5,314,031 A 5/1994 Hale et al.
5,325,923 A 7/1994 Surjaatmadja et al. ...... 166/308
5,330,005 A 7/1994 Card et al. .................. 166/280
5,359,026 A 10/1994 Gruber ....................... 528/354
5,360,068 A 11/1994 Sprunt et al. ................ 166/259
5,363,916 A 11/1994 Himes et al. ................ 166/276
5,373,901 A 12/1994 Norman et al. ............ 166/300
5,386,874 A 2/1995 Laramay et al. ............ 166/300
5,396,957 A 3/1995 Surjaatmadja et al. ...... 166/308
5,402,846 A 4/1995 Jennings, Jr. et al. ........ 166/259
5,439,055 A 8/1995 Card et al. .................. 166/280
5,460,226 A 10/1995 Lawton et al. ............. 166/300
5,464,060 A 11/1995 Hale et al. .................. 166/293
5,475,080 A 12/1995 Gruber et al. ............... 528/354
5,484,881 A 1/1996 Gruber et al. ............... 528/354
5,487,897 A 1/1996 Polson et al.
5,492,177 A 2/1996 Yeh et al.
5,496,557 A 3/1996 Feijen et al.
5,497,830 A 3/1996 Boles et al. ................. 166/300
5,499,678 A 3/1996 Surjaatmadja et al. ...... 166/298
5,501,276 A 3/1996 Weaver et al.
5,505,787 A 4/1996 Yamaguchi .................... 134/4
5,512,071 A 4/1996 Yam et al. ..................... 51/307
5,536,807 A 7/1996 Gruber et al. ............... 528/354
5,555,936 A 9/1996 Pirri et al.
5,591,700 A 1/1997 Harris et al. ................ 507/204
5,594,095 A 1/1997 Gruber et al. ............... 528/354
5,602,083 A 2/1997 Gabrysch et al.
5,604,186 A 2/1997 Hunt et al. .................. 507/204
5,607,905 A 3/1997 Dobson, Jr. et al. ......... 507/211
5,613,558 A 3/1997 Dillenbeck
5,670,473 A 9/1997 Scepanski ................... 510/445
5,697,440 A 12/1997 Weaver et al.
5,698,322 A 12/1997 Tsai et al. ................... 428/373
5,723,416 A 3/1998 Liao
5,765,642 A 6/1998 Surjaatmadja .............. 166/297
5,783,527 A 7/1998 Dobson, Jr. et al.
5,791,415 A 8/1998 Nguyen et al. .............. 166/280
5,799,734 A 9/1998 Norman et al.
5,833,000 A 11/1998 Weaver et al. ............... 166/276
5,849,401 A 12/1998 El-Afandi et al. ........... 428/215
5,853,048 A 12/1998 Weaver et al. ............... 166/279
5,893,416 A 4/1999 Read ......................... 166/304
5,908,073 A 6/1999 Nguyen et al. .............. 166/276
5,916,849 A 6/1999 House
5,924,488 A 7/1999 Nguyen et al. .............. 166/280
5,964,291 A 10/1999 Bourne et al. ............... 166/279
5,977,030 A 11/1999 House
5,979,557 A 11/1999 Card et al.
5,996,693 A 12/1999 Heathman
6,004,400 A 12/1999 Bishop et al. .................. 134/2
6,024,170 A 2/2000 McCabe et al. ............. 166/300
6,028,113 A 2/2000 Scepanski ................... 514/643
6,047,772 A 4/2000 Weaver et al. ............... 166/276
6,110,875 A 8/2000 Tjon-Joe-Pin et al.
6,114,410 A 9/2000 Betzold
6,123,159 A 9/2000 Brookey et al.
6,123,965 A 9/2000 Jacob et al. ................. 424/489
6,131,661 A 10/2000 Conner et al. ............... 166/300
6,135,987 A 10/2000 Tsai et al. ................... 604/365
6,143,698 A 11/2000 Murphey et al. ............ 507/145
6,148,917 A 11/2000 Brookey et al.
6,162,766 A 12/2000 Muir et al. .................. 507/267
6,169,058 B1 1/2001 Le et al. ..................... 507/222
6,172,011 B1 1/2001 Card et al. .................. 507/204
6,189,615 B1 2/2001 Sydansk ..................... 166/270
6,202,751 B1 3/2001 Chatterji et al. ............. 166/276
6,209,643 B1 4/2001 Nguyen et al. .............. 166/276
6,209,646 B1 4/2001 Reddy et al. ................ 166/300
6,214,773 B1 4/2001 Harris et al. ................ 507/271
6,242,390 B1 6/2001 Mitchell et al. ............. 507/211
6,260,622 B1 7/2001 Blok et al. ............... 166/305.1
6,291,013 B1 9/2001 Gibson et al.
6,300,286 B1 10/2001 Dobson, Jr. et al.
6,302,209 B1 10/2001 Thompson et al.
6,308,788 B1 10/2001 Patel et al.
6,311,773 B1 11/2001 Todd et al. .................. 166/280
6,323,307 B1 11/2001 Bigg et al. .................. 528/354
6,326,458 B1 12/2001 Gruber et al. ............... 528/354
6,328,105 B1 12/2001 Betzold ...................... 166/280
6,330,917 B2 12/2001 Chatterji et al.
6,357,527 B1 3/2002 Norman et al. ............. 166/300
6,364,945 B1 4/2002 Chatterji et al. ............. 106/677
6,380,138 B1 4/2002 Ischy et al. ................. 507/204
6,387,986 B1 5/2002 Moradi-Araghi et al. .... 523/211
6,390,195 B1 5/2002 Nguyen et al. .............. 166/276
6,394,185 B1 5/2002 Constien ..................... 166/296
6,422,314 B1 7/2002 Todd et al. .................. 166/312
6,422,326 B1 7/2002 Brookey et al.
6,432,155 B1 8/2002 Swazey et al.
6,454,003 B1 9/2002 Chang et al. ................ 166/270
6,485,947 B1 11/2002 Rajgarhia et al. ........... 435/139
6,488,763 B2 12/2002 Brothers et al. ............. 106/692
6,494,263 B2 12/2002 Todd .......................... 166/312
6,508,305 B1 1/2003 Brannon et al. ............. 166/293
6,509,301 B1 1/2003 Vollmer et al.
6,527,051 B1 3/2003 Reddy et al. ................ 166/300
6,554,071 B1 4/2003 Reddy et al. ................ 166/293
6,566,310 B2 5/2003 Chan
6,569,814 B1 5/2003 Brady et al. ................ 507/201
6,578,630 B2 6/2003 Simpson et al.
6,599,863 B1 7/2003 Palmer et al. ............... 507/219
6,667,279 B1 12/2003 Hessert et al. .............. 507/225
6,669,771 B2 12/2003 Tokiwa et al. ............ 106/162.7
6,681,856 B1 1/2004 Chatterji et al. ............. 166/294
6,686,328 B1 2/2004 Binder ....................... 510/446
6,691,780 B2 2/2004 Nguyen et al.
6,702,023 B1 3/2004 Harris et al.
6,710,019 B1 3/2004 Sawdon et al. .............. 507/136
6,716,797 B2 4/2004 Brookey
6,737,385 B2 5/2004 Todd et al.
6,761,218 B2 7/2004 Nguyen et al. .............. 166/278
6,763,888 B1 7/2004 Harris et al. ............. 166/305.1
6,764,981 B1 7/2004 Eoff et al.
6,793,018 B2 9/2004 Dawson et al.
6,793,730 B2 9/2004 Reddy et al.
6,806,235 B1 10/2004 Mueller et al.
6,817,414 B2 11/2004 Lee
6,818,594 B1 11/2004 Freeman et al.
6,837,309 B2 1/2005 Boney et al. ............. 166/280.2
6,883,608 B2 4/2005 Parlar et al.

6,896,058 B2 5/2005 Munoz, Jr. et al. .......... 166/279
6,904,971 B2 6/2005 Brothers et al.
6,949,491 B2 9/2005 Cooke, Jr. ................... 507/219
6,959,767 B2 11/2005 Horton et al.
6,978,838 B2 12/2005 Parlar et al.
6,981,552 B2 1/2006 Reddy et al.
6,983,801 B2 1/2006 Dawson et al.
6,987,083 B2 1/2006 Phillippi et al.
6,997,259 B2 2/2006 Nguyen
7,007,752 B2 3/2006 Reddy et al.
7,021,377 B2 4/2006 Todd et al.
7,032,663 B2 4/2006 Nguyen
7,036,586 B2 5/2006 Roddy et al.
7,036,587 B2 5/2006 Munoz, Jr. et al.
7,044,220 B2 5/2006 Nguyen et al.
7,044,224 B2 5/2006 Nguyen
7,063,151 B2 6/2006 Nguyen et al.
7,066,258 B2 6/2006 Justus et al.
7,069,994 B2 7/2006 Cooke, Jr.
7,080,688 B2 7/2006 Todd et al. .................. 166/278
7,093,664 B2 8/2006 Todd et al.
7,096,947 B2 8/2006 Todd et al.
7,101,829 B2 9/2006 Guichard et al.
7,131,491 B2 11/2006 Blauch et al.
7,140,438 B2 11/2006 Frost et al.
7,147,067 B2 12/2006 Getzalf et al.
7,151,077 B2 * 12/2006 Prud'homme et al. ....... 507/219
7,156,174 B2 1/2007 Roddy et al.
7,165,617 B2 * 1/2007 Lord et al. ............... 166/308.5
7,168,489 B2 1/2007 Frost et al.
7,172,022 B2 2/2007 Reddy et al.
7,178,596 B2 2/2007 Blauch et al. ............... 166/280
7,195,068 B2 3/2007 Todd
7,204,312 B2 4/2007 Roddy et al.
7,219,731 B2 5/2007 Sullivan et al. ............. 166/278
7,261,156 B2 8/2007 Nguyen et al.
7,264,051 B2 9/2007 Nguyen et al.
7,299,876 B2 11/2007 Lord et al.
7,303,014 B2 12/2007 Reddy et al.
7,306,037 B2 12/2007 Nguyen et al.
7,322,412 B2 1/2008 Badalamenti et al.
7,353,876 B2 4/2008 Savery et al.
7,353,879 B2 4/2008 Todd et al.
7,413,017 B2 8/2008 Nguyen et al.
7,448,450 B2 11/2008 Luke et al.
7,455,112 B2 11/2008 Moorehead et al.
7,461,697 B2 12/2008 Todd et al.
7,475,728 B2 1/2009 Pauls et al.
7,484,564 B2 2/2009 Welton et al.
7,497,258 B2 3/2009 Savery et al.
7,497,278 B2 3/2009 Schriener et al.
7,506,689 B2 3/2009 Surjaatmadja et al.
2001/0016562 A1 8/2001 Muir et al. .................. 507/201
2002/0036088 A1 3/2002 Todd .......................... 166/300
2002/0119169 A1 8/2002 Angel et al.
2002/0125012 A1 9/2002 Dawson et al. .............. 166/300
2003/0054962 A1 3/2003 England et al.
2003/0060374 A1 3/2003 Cooke, Jr. ................... 507/200
2003/0114314 A1 6/2003 Ballard et al. ............... 507/100
2003/0130133 A1 7/2003 Vollmer ...................... 507/100
2003/0147965 A1 8/2003 Bassett et al.
2003/0188766 A1 10/2003 Banerjee et al. ................ 134/7
2003/0230407 A1 12/2003 Vijn et al.
2003/0234103 A1 12/2003 Lee et al. .................... 166/293
2004/0014606 A1 1/2004 Parlar et al.
2004/0014607 A1 1/2004 Sinclair et al. .............. 507/200
2004/0040706 A1 3/2004 Hossaini et al. ............. 166/278
2004/0055747 A1 3/2004 Lee ........................... 166/278
2004/0070093 A1 4/2004 Mathiowitz et al.
2004/0094300 A1 5/2004 Sullivan et al. .......... 166/308.1
2004/0099416 A1 5/2004 Vijn et al.
2004/0106525 A1 6/2004 Willbert et al. ............. 507/200
2004/0138068 A1 7/2004 Rimmer et al. ............. 507/100
2004/0152601 A1 8/2004 Still et al. .................. 507/100
2004/0152602 A1 8/2004 Boles ......................... 507/100
2004/0162386 A1 8/2004 Altes et al.
2004/0170836 A1 9/2004 Bond et al.
2004/0214724 A1 10/2004 Todd et al.
2004/0216876 A1 11/2004 Lee ......................... 166/280.1
2004/0231845 A1 11/2004 Cooke, Jr. .................. 166/279
2004/0261993 A1 12/2004 Nguyen ...................... 166/276
2004/0261995 A1 12/2004 Nguyen et al. .............. 166/279
2004/0261996 A1 12/2004 Munoz, Jr. et al. .......... 166/279
2004/0261999 A1 12/2004 Nguyen ...................... 166/292
2005/0006095 A1 1/2005 Justus et al. ................ 166/295
2005/0028976 A1 2/2005 Nguyen ...................... 166/276
2005/0034861 A1 * 2/2005 Saini et al. .................. 166/278
2005/0034865 A1 2/2005 Todd et al. .................. 166/304
2005/0059556 A1 3/2005 Munoz, Jr. et al.
2005/0059557 A1 3/2005 Todd et al.
2005/0059558 A1 3/2005 Blauch et al.
2005/0103496 A1 5/2005 Todd et al. .................. 166/278
2005/0126785 A1 * 6/2005 Todd .......................... 166/307
2005/0183741 A1 8/2005 Surjaatmadja et al.
2005/0205266 A1 9/2005 Todd et al.
2005/0252659 A1 11/2005 Sullivan et al. .......... 166/280.1
2005/0272613 A1 12/2005 Cooke, Jr. ................... 507/219
2005/0277554 A1 12/2005 Blauch et al.
2006/0016596 A1 1/2006 Pauls et al.
2006/0032633 A1 2/2006 Nguyen
2006/0046938 A1 3/2006 Harris et al.
2006/0048938 A1 3/2006 Kalman
2006/0065397 A1 3/2006 Nguyen et al.
2006/0105917 A1 * 5/2006 Munoz ....................... 507/103
2006/0169448 A1 8/2006 Savery et al.
2006/0169452 A1 8/2006 Savery et al.
2006/0169453 A1 8/2006 Savery et al.
2006/0172893 A1 8/2006 Todd et al.
2006/0205608 A1 9/2006 Todd
2006/0243449 A1 11/2006 Welton et al.
2006/0247135 A1 11/2006 Welton et al.
2006/0254774 A1 11/2006 Saini et al.
2006/0283597 A1 12/2006 Schriener et al. ............ 166/300
2007/0042912 A1 2/2007 Welton et al.
2007/0049501 A1 3/2007 Saini et al.
2007/0066492 A1 3/2007 Funkhouser et al.
2007/0066493 A1 3/2007 Funkhouser et al.
2007/0078063 A1 4/2007 Munoz, Jr.
2007/0078064 A1 4/2007 Munoz et al.
2007/0235190 A1 * 10/2007 Lord et al. ............... 166/280.2
2007/0238623 A1 10/2007 Saini et al.
2007/0281868 A1 12/2007 Pauls et al.
2008/0026955 A1 1/2008 Munoz et al.
2008/0026959 A1 1/2008 Munoz et al.
2008/0026960 A1 1/2008 Munoz et al.
2008/0027157 A1 1/2008 Munoz et al.
2008/0070810 A1 3/2008 Mang
2008/0139415 A1 6/2008 Todd et al.
2008/0169102 A1 7/2008 Carbajal et al.
2009/0062157 A1 3/2009 Munoz et al.

FOREIGN PATENT DOCUMENTS

EP 0 672 740 A1 3/1995
EP 0 672 740 A1 9/1995
EP 0 879 935 A2 11/1998
EP 0 879 935 A3 10/1999
EP 1 413 710 A1 4/2004
JP 2004181820 A 7/2004
WO WO 93/15127 8/1993
WO WO 94/07949 4/1994
WO WO 94/08078 4/1994
WO WO 94/08090 4/1994
WO WO 95/09879 4/1995
WO WO 97/11845 4/1997
WO WO 99/27229 6/1999

| | | | |
|---|---|---|---|
| WO | WO 00/57022 | | 9/2000 |
| WO | WO 01/02698 | | 1/2001 |
| WO | WO 01/87797 | A1 | 11/2001 |
| WO | WO 01/94744 | | 12/2001 |
| WO | WO 02/55843 | | 1/2002 |
| WO | WO 02/12674 | A1 | 2/2002 |
| WO | WO 03/027431 | A2 | 4/2003 |
| WO | WO 03/027431 | A3 | 4/2003 |
| WO | WO 2004/007905 | | 1/2004 |
| WO | WO 2004/037946 | A1 | 5/2004 |
| WO | WO 2004/038176 | | 5/2004 |
| WO | WO 2004/038176 | A1 | 5/2004 |

OTHER PUBLICATIONS

Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level I Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions, Halliburton Communications*, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Blauch, et al, *Aqueous Tackifier and Methods of Controlling Particulates*, U.S. Appl. No. 10/864,061, filed Jun. 9, 2004.
Blauch, et al, *Aqueous-Based Tackifier Fluids and Methods of Use*, U.S. Appl. No. 10/864,618, filed Jun. 9, 2004.
U.S. Appl. No. 10/650,101, filed Aug. 26, 2003, Todd, et al.
U.S. Appl. No. 10/655,883, filed Sep. 5, 2003, Nguyen.
U.S. Appl. No. 10/661,173, filed Sep. 11, 2003, Todd, et al.
U.S. Appl. No. 10/664,126, filed Sep. 17, 2003, Todd, et al.
Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.
M. Ahmad, et al.: "Ortho Ester Hydrolysis: Direct Evidence for a Three-Stage Reaction Mechanism, "Engineering Information Inc., NY, NY, vol . 101, No. 10 (XP-002322843), May 9, 1979.
Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho esters)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemcial "Trigger" Useful for Oilfield Applications*, Society of Petroleum Engineers, Inc., SPE 92709, Feb. 4, 2005.
Written Opinion and Search Report for Application No. PCT/GB2005/004389, Mar. 24, 2006.
Foreign communication related to a counterpart application dated Mar. 24, 2006.
Kiyoshi Matsuyama et al, Environmentally benign formation of polymeric microspheres by rapid expansion of supercritical carbon dioxide solution with a nonsolvent, Environ Sci Technol 2001, 35, 4149-4155.
Office Action dated Feb. 1, 2008 from U.S. Appl. No. 10/991,248, Feb. 1, 2008.
Office Action dated Oct. 24, 2007 from U.S. Appl. No. 10/991,248, Oct. 24, 2007.
Office Action dated Jun. 15, 2007 from U.S. Appl. No. 10/991,248, Jun. 15, 2007.
Notice of Allowance and Notice of Allowability for U.S. Appl. No. 10/991,248, mailed Jan. 30, 2009.
Office Action mailed Aug. 13, 2008 from U.S. Appl. No. 10/991,248.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.

* cited by examiner

METHODS OF DEGRADING FILTER CAKES IN SUBTERRANEAN FORMATIONS

BACKGROUND

The present invention relates to subterranean treatment operations, and more particularly, to methods of degrading filter cakes in subterranean formations.

Often, once drilling of a well bore in a subterranean formation has been initiated, a fluid referred to as a "well drill-in and servicing fluid" may be employed. As referred to herein, the term "well drill-in and servicing fluid" will be understood to mean a fluid placed in a subterranean formation, such as those from which production has been, is being, or may be cultivated. For example, an operator may begin drilling a subterranean borehole using a drilling fluid, cease drilling at a depth just above that of a productive formation, circulate a sufficient quantity of a well drill-in and servicing fluid through the bore hole to completely flush out the drilling fluid, then proceed to drill into the desired formation using the well drill-in and servicing fluid. Well drill-in and servicing fluids often may be utilized, inter alia, to minimize damage to the permeability of such formations.

Well drill-in and servicing fluids may include "fluid-loss-control fluids." As referred to herein, the term "fluid-loss-control fluid" will be understood to mean a fluid designed to form a filter cake onto a screen or gravel pack, or in some cases, directly onto the formation. For example, a fluid-loss-control fluid may comprise a comparatively small volume of fluid designed to form a filter cake so as to plug off a "thief zone" (e.g., a formation, most commonly encountered during drilling operations, into which the drilling fluid may be lost). Generally, well drill-in and servicing fluids are designed to form a fast and efficient filter cake on the walls of a well bore within a producing formation to minimize leak-off and damage. The filter cake often comprises an inorganic portion (e.g., calcium carbonate), and an organic portion (e.g., starch and xanthan). The filter cake generally is removed before hydrocarbons from the formation are produced. Conventional methods of removal have involved contacting the filter cake with one or more subsequent fluids.

Other conventional methods of removing the filter cake include formulating the well drill-in and servicing fluid so as to include an acid-soluble particulate solid bridging agent. The resultant filter cake formed by such well drill-in and servicing fluid then is contacted with a strong acid to ultimately dissolve the bridging agent. This method is problematic, however, because the strong acid often corrodes metallic surfaces of completion equipment (e.g., sand control screens), thereby causing such equipment to prematurely fail. Further, the strong acid may damage the producing formation. Additionally, the strong acid may cause the bridging agent to dissolve prematurely, resulting in the loss of the strong acid into the formation, before it can completely cover the filter cake.

Another method of filter cake removal has involved the use of a water-soluble particulate solid bridging agent in the well drill-in and servicing fluid, which bridging agent subsequently is contacted with an aqueous salt solution that is undersaturated with respect to such bridging agent. This method is problematic, however, because such bridging agents may require a relatively long period of time to dissolve in the aqueous salt solution, due to, inter alia, the presence of various gelling agents in the well drill-in and servicing fluids. Such gelling agents may prevent the aqueous salt solution from contacting the water-soluble bridging agents.

Operators also have attempted to remove the filter cake by contacting it with a combination of an acid and an oxidizer. The acid may be used to degrade the inorganic portion of the filter cake, while the oxidizer may be employed to degrade the organic portion. However, this may be unnecessarily expensive, as it involves placement of additional components into the formation, at additional cost. For example, operators have attempted to remove the filter cake by flowing a solution comprising hydrogen peroxide into the well bore and permitting it to contact the filter cake. This may be problematic, however, as the transportation, storage, and handling of hydrogen peroxide may present safety concerns.

SUMMARY

The present invention relates to subterranean treatment operations, and more particularly, to methods of degrading filter cakes in subterranean formations.

An example of a method of the present invention is a method of drilling a well bore in a subterranean formation, comprising: using a well drill-in and servicing fluid to drill a well bore in a subterranean formation, the well drill-in and servicing fluid comprising a base fluid, a viscosifier, a fluid loss control additive, a bridging agent, and a delayed-release acid component; permitting the well drill-in and servicing fluid to establish a filter cake in at least a portion of the well bore; contacting the filter cake with an initiator component; and permitting the filter cake to degrade at a desired time. In certain embodiments of the present invention, the filter cake may be formed upon the face of the formation itself, upon a sand screen, or upon a gravel pack. Inter alia, the well drill-in and servicing fluid may be circulated through a drill pipe and drill bit in contact with the subterranean formation, in certain embodiments of the present invention.

Another example of a method of the present invention is a method of degrading a filter cake in a subterranean formation, the filter cake comprising an inorganic portion and an organic portion, and having been established in the formation by a well drill-in and servicing fluid that comprises a delayed-release acid component, the method comprising: permitting the delayed-release acid component to release an acid; contacting the filter cake with an initiator component; permitting the initiator component to interact with the released acid to produce an oxidizer; allowing the released acid to degrade at least a portion of the inorganic portion of the filter cake; and allowing the oxidizer to degrade at least a portion of the organic portion of the filter cake.

An example of a composition of the present invention is a well drill-in and servicing fluid comprising: a base fluid; a viscosifier; a fluid loss control additive; a bridging agent; and a delayed-release acid component.

The features and advantages of the present invention will be readily apparent to those skilled in the art upon a reading of the description of the embodiments which follows.

DETAILED DESCRIPTION

The present invention relates to subterranean treatment operations, and more particularly, to methods of degrading filter cakes in subterranean formations.

Certain embodiments of the methods of the present invention comprise degrading a filter cake in a subterranean formation by reacting an initiator component with a delayed-release acid component that may be present in the filter cake. In certain embodiments of the present invention, the filter cake has been established in the subterranean formation by a well drill-in and servicing fluid of the present invention generally comprising a base fluid, a viscosifier, a fluid loss control additive, a bridging agent, and a delayed-release acid component.

The base fluid utilized in the well drill-in and servicing fluids of the present invention may be aqueous-based, non-aqueous-based, or mixtures thereof. Where the base fluid is aqueous-based, the base fluid may comprise fresh water, salt water (e.g., water containing one or more salts dissolved therein), brine (e.g., saturated salt water), or seawater. Generally, the water can be from any source provided that it does not contain an excess of compounds that may adversely affect other components in the well drill-in and servicing fluid. Where the base fluid is non-aqueous-based, the base fluid may comprise any number of organic fluids. Examples of suitable organic fluids include, but are not limited to, mineral oils, synthetic oils, esters, and the like, and derivatives thereof. Generally, these organic fluids may be referred to generically as "oils." Generally, any oil in which a water solution of salts can be emulsified may be suitable for use as a non-aqueous-based base fluid in the well drill-in and servicing fluids of the present invention. Generally, the base fluid may be present in an amount sufficient to form a pumpable well drill-in and servicing fluid. More particularly, the base fluid typically is present in the well drill-in and servicing fluids of the present invention in an amount in the range of from about 20% to about 99.99% by volume of the well drill-in and servicing fluid.

The well drill-in and servicing fluids of the present invention further comprise a viscosifier. Examples of suitable viscosifiers include, inter alia, biopolymers (e.g., xanthan and succinoglycan), cellulose, cellulose derivatives (e.g., hydroxyethylcellulose), guar, and guar derivatives (e.g., hydroxypropyl guar). In certain embodiments of the present invention, the viscosifier is guar. Commercially available examples of suitable viscosifiers include, but are not limited to, those that are available from Halliburton Energy Services, Inc., of Duncan, Okla., under the trade name "N-VIS." Generally, the viscosifier is present in the well drill-in and servicing fluids of the present invention in an amount sufficient to provide a desired degree of solids suspension. More particularly, the viscosifier may be present in the well drill-in and servicing fluids of the present invention in an amount in the range of from about 0.01% to about 1.0% by weight. In certain embodiments, the viscosifier is present in the well drill-in and servicing fluids of the present invention in an amount in the range of from about 0.2% to about 0.6% by weight.

The well drill-in and servicing fluids of the present invention further comprise a fluid loss control additive. A variety of fluid loss control additives can be included in the well drill-in and servicing fluids of the present invention, including, inter alia, polysaccharides and derivatives thereof. Examples of suitable fluid loss control additives include, inter alia, starch, starch ether derivatives, hydroxyethylcellulose, cross-linked hydroxyethylcellulose, and mixtures thereof. In certain embodiments, the fluid loss control additive is starch. Commercially available examples of suitable fluid loss control additives include, but are not limited to, those that are available from Halliburton Energy Services, Inc., of Duncan, Okla., under the trade name "N-Dril HT PLUS." The fluid loss control additive generally is present in the well drill-in and servicing fluids of the present invention in an amount sufficient to provide a desired degree of fluid loss control. More particularly, the fluid loss control additive may be present in the well drill-in and servicing fluids of the present invention in an amount in the range of from about 0.01% to about 3% by weight. In certain embodiments, the fluid loss control additive is present in the well drill-in and servicing fluids of the present invention in an amount in the range of from about 1% to about 2% by weight.

The well drill-in and servicing fluids of the present invention further comprise a bridging agent. The well drill-in and servicing fluids of the present invention suspend the bridging agent and, as the well drill-in and servicing fluids begin to form a filter cake within the subterranean formation, the bridging agent becomes distributed throughout the resulting filter cake, most preferably uniformly. In certain embodiments of the present invention, the filter cake may form upon the face of the formation itself, upon a sand screen, or upon a gravel pack. In certain embodiments of the present invention, the bridging agent comprises, inter alia, calcium carbonate, a magnesium compound (e.g., magnesium oxide), or a chemically bonded ceramic bridging agent, or derivatives thereof. Generally, the bridging agent is present in the well drill-in and servicing fluids of the present invention in an amount sufficient to create an efficient filter cake. As referred to herein, the term "efficient filter cake" will be understood to mean a filter cake comprising no material beyond that required to provide a desired level of fluid loss control. In certain embodiments of the present invention, the bridging agent is present in the well drill-in and servicing fluids of the present invention in an amount ranging from about 0.1% to about 32% by weight. In certain embodiments of the present invention, the bridging agent is present in the well drill-in and servicing fluids of the present invention in the range of from about 3% and about 10% by weight. In certain embodiments of the present invention, the bridging agent is present in the well drill-in and servicing fluids of the present invention in an amount sufficient to provide a fluid loss of less than about 15 mL in tests conducted according to the procedures set forth by API Recommended Practice (RP) 13.

The well drill-in and servicing fluids of the present invention further comprise a delayed-release acid component. When the well drill-in and servicing fluids of the present invention have been formulated and placed within the subterranean formation, the delayed-release acid component releases an acid (e.g., lactic acid), as illustrated in Equation 1 below:

EQUATION 1:

$$\text{[Delayed Release Acid Component]} + \text{[water]} + \text{[optional catalyst]} \xrightarrow{k1} \text{[Released Acid]} + \text{[oligomers]}$$

The optional catalyst may be present within the well drill-in and servicing fluids of the present invention, or may be placed in the well bore separately. The optional catalyst may comprise an acid, or a base. One of ordinary skill in the art, with the benefit of this disclosure, will recognize when the use of an optional catalyst may be appropriate for a particular application, and whether such optional catalyst should comprise an acid or a base.

The released acid reacts with the initiator component to produce an oxidizer, as illustrated in Equation 2 below:

EQUATION 2:

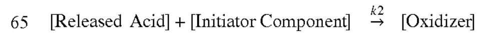

$$\text{[Released Acid]} + \text{[Initiator Component]} \xrightarrow{k2} \text{[Oxidizer]}$$

In certain embodiments of the present invention, the oxidizer produced may be, inter alia, hydrogen peroxide. In certain embodiments of the present invention, one or more byproducts may be produced by the reaction between the released acid and the initiator component. For example, when the released acid comprises lactic acid, and the initiator component comprises lactate oxidase, the reaction between lactic acid and lactate oxidase may produce an oxidizer (e.g., hydrogen peroxide) and a byproduct (e.g., pyruvic acid). Accordingly, the compositions and methods of the present invention are capable of producing an oxidizer while within the subterranean formation, thereby eliminating or reducing certain safety concerns that may be present in conventional operations, e.g., safety concerns that accompany the storage, transportation, and handling of oxidizers that are injected into the formation from the surface.

In addition to reacting with the initiator component, the released acid also may react with the inorganic portion of the filter cake, as illustrated in Equation 3 below:

EQUATION 3:

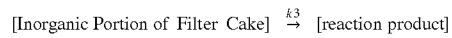

$$\text{[Released Acid]} + \text{[Inorganic Portion of Filter Cake]} \xrightarrow{k3} \text{[reaction product]}$$

For example, where the inorganic portion of the filter cake comprises calcium carbonate, and where the released acid comprises lactic acid, the reaction product may comprise calcium lactate. As another example, where the inorganic portion of the filter cake comprises magnesium oxide, and where the released acid comprises lactic acid, the reaction product may comprise magnesium lactate.

The rate at which the released acid is released by the delayed-release acid component, "k1," inter alia, may largely determine the total degradation time of the inorganic portion of the filter cake (though, as will be described further with reference to "k2," the total degradation time of the inorganic portion of the filter cake may be delayed, inter alia, by the presence and amount of an initiator component). Generally, k1 depends on factors such as, inter alia, the time during which water and the delayed release acid component are permitted to contact each other, the amount of water that is available to react with the delayed release acid component, temperature, and the presence or absence of the optional catalyst. Generally, both acid catalysts and base catalysts may be used to increase k1. In certain embodiments of the present invention, the reaction depicted in Equation 1 may be base-catalyzed, and caustic may be used as the optional catalyst.

The reaction rate between the initiator component and the released acid, "k2," inter alia, determines the extent to which the reaction between the released acid and the inorganic portion of the filter cake may be delayed. Furthermore, the oxidizer produced by the reaction of the released acid with the initiator component may degrade the organic portions of a filter cake that has been established in a subterranean formation by the well drill-in and servicing fluid. In certain embodiments of the present invention, k2 may be increased by permitting the reaction to occur in the presence of an oxygen source (e.g., by bubbling oxygen into the region of the subterranean formation where the reaction is occurring). In certain embodiments of the present invention, k2 may be decreased by the placement of a temporary physical barrier between the initiator component and the released acid, e.g., by encapsulating the initiator component in a suitable encapsulant, which encapsulant may be selected to degrade within the subterranean formation at a desired time. Examples of suitable encapsulants for the initiator component may include, inter alia, fatty acids, and the like.

The delayed-release acid components generally comprise an acid derivative. Examples of suitable acid derivatives include, but are not limited to: esters, such as ortho esters; poly(ortho esters); aliphatic polyesters; lactides, poly(lactides); glycolides; poly(glycolides); lactones; poly(ϵ-caprolactones); poly(hydroxybutyrates); anhydrides; poly(anhydrides); and poly(amino acids). The delayed-release acid components also may comprise an esterase enzyme (e.g., proteinase-K), if desired. In certain embodiments of the present invention, the esterase enzyme may be encapsulated by means known in the art. Blends of certain acid-releasing degradable materials also may be suitable. One example of a suitable blend of materials includes a blend of a poly(lactic acid) and an ortho ester. It is within the ability of one skilled in the art, with the benefit of this disclosure, to select a suitable acid-releasing degradable material. When used in the present invention, a desirable result may be achieved if the acid-releasing degradable material degrades slowly over time, as opposed to instantaneously.

In certain embodiments of the present invention, the delayed-release acid components may comprise a mixture of an acid derivative and a hydrated organic or inorganic solid compound. For example, in circumstances wherein an insufficient amount of water is present in the subterranean formation to facilitate the degradation of the acid derivative, a desirable choice for a delayed-release acid component may comprise a mixture of an acid derivative and a hydrated organic or inorganic solid compound. In an embodiment of the present invention, the acid derivative may degrade in the water provided by the hydrated organic or inorganic compound, which dehydrates over time when heated in the subterranean zone. Examples of such hydrated organic or inorganic compounds may include, but are not limited to: sodium acetate trihydrate; L-tartaric acid disodium salt dihydrate; sodium citrate dihydrate; sodium tetraborate decahydrate; sodium hydrogen phosphate heptahydrate; sodium phosphate dodecahydrate; amylose; starch-based hydrophilic polymers; or cellulose-based hydrophilic polymers.

The delayed-release acid components generally may be present in the well drill-in and servicing fluids of the present invention in an amount sufficient to release a desired amount of acid. In certain embodiments of the present invention, the desired amount of acid that will be released is an amount that will: (1) react with an initiator component to produce a desired amount of an oxidizer; and (2) degrade at least a portion of the inorganic component of the filter cake. The oxidizer produced by the reaction between the initiator component and the released acid may degrade the organic portions of a filter cake that has been established in a subterranean formation by, inter alia, a well drill-in and servicing fluid. In certain embodiments of the present invention, the delayed-release acid component may be present in the well drill-in and servicing fluids of the present invention in an amount in the range of from about 1% to about 40% by weight. In certain embodiments of the present invention, the delayed-release acid component may be present in the well drill-in and servicing fluids of the present invention in an amount in the range of from about 5% to about 20% by weight.

In accordance with certain embodiments of the methods of the present invention, an initiator component may be placed in the subterranean formation at a desired time, so as to contact, and react with, an acid released by the delayed-release acid component (that may be present in a well drill-in and servicing fluid of the present invention), to thereby produce an oxidizer. Examples of suitable initiator components include, inter alia, enzymes such as lactate oxidase, and the like. Generally, the amount of initiator component required is an amount sufficient to: (1) delay, for a desired period of time, the interaction between the inorganic portion of the filter cake and the acid released by the delayed-release acid component; and (2) produce a sufficient amount of an oxidizer (e.g., a peroxide such as hydrogen peroxide) when reacting with the released acid to ultimately degrade at least a portion of the organic portion of the filter cake. In certain embodiments of the present invention, the amount of the initiator component that may be placed in the subterranean formation may be an amount in the range of from about 0.0005% to about 0.01% by weight of the delayed-release acid component. In certain embodiments of the present invention, the amount of the initiator component that may be placed in the subterranean formation may be an amount in the range of from about 0.001% to about 0.002% by weight of the delayed-release acid component. For example, where the delayed-release acid component is poly(lactic acid) and the initiator component is lactate oxidase, the initiator component may be added in a ratio of 2 milligrams of lactate oxidase per 1 gram of poly (lactic acid). In certain embodiments of the present invention where an operator desires a long delay of the interaction between the released acid and the inorganic portion of the filter cake, the operator may elect to increase the amount of the initiator component. However, the particular acid-derivative component of the delayed-release acid composition, the particular components of the filter cake, and any other components present in the well bore (e.g., other acids) may dictate the appropriate amount to include. Also, the desired delay period for degrading the filter cake should be considered in deciding upon the appropriate relative concentrations of the delayed-release acid component and the initiator component. One of ordinary skill in the art, with the benefit of this disclosure, will recognize the appropriate amount of each component to include for a desired application.

Generally, the initiator component interacts with acids present in the well bore (e.g., the acid released by the delayed-release acid component) in such a way as to delay the interaction between at least a portion of the acids and at least a portion of the inorganic portion of the filter cake for a period of time, thereby delaying degradation of the inorganic portion of the filter cake by the acid. Thus, the integrity of the filter cake may not be jeopardized for a given desired delay period. Degradation of only a very small percentage of the inorganic portion of the filter cake (e.g., less than about 2%) may compromise the integrity of the filter cake. The reaction between the initiator component and the released acid also generates an oxidizer (e.g., a peroxide) that ultimately may degrade the organic portion of the filter cake. In certain embodiments, the oxidizer may be, inter alia, hydrogen peroxide and/or pyruvate. The oxidizer then may interact with the organic portion of the filter cake to ultimately degrade at least a portion of the organic portion of the filter cake.

An example of a composition of the present invention is a well drill-in and servicing fluid comprising 78.5% water by weight, 7.9% sodium chloride by weight, 0.2% N-VIS by weight, 1.7% N Dril HT PLUS by weight, 7.0% poly(lactic acid) by weight, and 4.7% calcium carbonate by weight.

An example of a method of the present invention is a method of drilling a well bore in a subterranean formation, comprising: using a well drill-in and servicing fluid to drill a well bore in a subterranean formation, the well drill-in and servicing fluid comprising a base fluid, a viscosifier, a fluid loss control additive, a bridging agent, and a delayed-release acid component; permitting the well drill-in and servicing fluid to establish a filter cake in at least a portion of the well bore; contacting the filter cake with an initiator component; and permitting the filter cake to degrade at a desired time. In certain embodiments of the present invention, the filter cake may be formed upon the face of the formation itself, upon a sand screen, or upon a gravel pack. Inter alia, the well drill-in and servicing fluid may be circulated through a drill pipe and drill bit in contact with the subterranean formation, in certain embodiments of the present invention.

Another example of a method of the present invention is a method of degrading a filter cake in a subterranean formation, the filter cake comprising an inorganic portion and an organic portion, and having been established in the formation by a well drill-in and servicing fluid that comprises a delayed-release acid component, the method comprising: permitting the delayed-release acid component to release an acid; contacting the filter cake with an initiator component; permitting the initiator component to interact with the released acid to produce an oxidizer; allowing the released acid to degrade at least a portion of the inorganic portion of the filter cake; and allowing the oxidizer to degrade at least a portion of the organic portion of the filter cake.

An example of a composition of the present invention is a well drill-in and servicing fluid comprising: a base fluid; a viscosifier; a fluid loss control additive; a bridging agent; and a delayed-release acid component.

Therefore, the present invention is well adapted to carry out the objects and attain the ends and advantages mentioned as well as those that are inherent therein. While the invention has been described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of drilling a well bore in a subterranean formation, comprising:

using a well drill-in and servicing fluid to drill a well bore in a subterranean formation, the well drill-in and servicing fluid comprising a base fluid, a viscosifier, a fluid loss control additive, a bridging agent, and at least one delayed-release acid component selected from the group consisting of an ortho ester and a poly(ortho ester), wherein the delayed-release acid component is present in the well drill-in and servicing fluid in an amount in the range of from about 1% to about 40% by weight;

permitting the well drill-in and servicing fluid to establish a filter cake in at least a portion of the well bore;

contacting the filter cake with an initiator component separate from the well drill-in and servicing fluid; and permitting the filter cake to degrade at a desired time.

2. The method of claim 1 wherein the base fluid is aqueous-based, nonaqueous-based, or a mixture thereof.

3. The method of claim 2 wherein the nonaqueous-based base fluid comprises at least one fluid selected from the group consisting of: mineral oil, a synthetic oil, an ester, and any derivative thereof.

4. The method of claim 1 wherein the viscosifier comprises at least one viscosifier selected from the group consisting of: a biopolymer, cellulose, a cellulose derivative, guar, and any guar derivative.

5. The method of claim 4 wherein the biopolymer is xanthan or succinoglycan.

6. The method of claim 4 wherein the cellulose derivative is hydroxyethylcellulose.

7. The method of claim 4 wherein the guar derivative is hydroxypropyl guar.

8. The method of claim 1 wherein the step of permitting the well drill-in and servicing fluid to establish a filter cake in at least a portion of the well bore comprises forming the filter cake upon the face of the formation itself, upon a sand screen, or upon a gravel pack.

9. The method of claim 1 wherein the base fluid is present in the well drill-in and servicing fluid in an amount in the range of from about 20% to about 99.99% by volume.

10. The method of claim 1 wherein the viscosifier is present in the well drill-in and servicing fluid in an amount sufficient to provide a desired degree of solids suspension.

11. The method of claim 1 wherein the viscosifier is present in the well drill-in and servicing fluid in an amount in the range of from about 0.2% to about 0.6% by weight.

12. The method of claim 1 wherein the fluid loss control additive is present in the well drill-in and servicing fluid in an amount sufficient to provide a desired degree of fluid loss control.

13. The method of claim 1 wherein the fluid loss control additive is present in the well drill-in and servicing fluid in an amount in the range of from about 0.01% to about 3% by weight.

14. The method of claim 1 wherein the bridging agent comprises at least one bridging agent selected from the group consisting of: calcium carbonate, a magnesium compound, a chemically bonded ceramic bridging agent, and any derivative thereof.

15. The method of claim 1 wherein the bridging agent is present in the well drill-in and servicing fluid in an amount sufficient to create an efficient filter cake.

16. The method of claim 1 wherein the bridging agent is present in the well drill-in and servicing fluid in an amount in the range of from about 0.1% to about 32% by weight.

17. The method of claim 1 wherein the delayed-release acid component further comprises at least one acid derivative selected from the group consisting of: an ester; an aliphatic polyester; a lactide; a poly(lactide); a glycolide; a poly(glycolide); a lactone; a poly($\epsilon$-caprolactone); a poly(hydroxybutyrate); an anhydride; a poly(anhydride); a poly(amino acid); an esterase enzyme; and any derivative thereof.

18. The method of claim 1 wherein the delayed-release acid component comprises a blend of poly(lactic acid) and an ortho ester.

19. The method of claim 1 wherein the initiator component comprises at least one component selected from the group consisting of lactate oxidase and any derivative thereof.

20. The method of claim 1 wherein using a well drill-in and servicing fluid to drill a well bore in a subterranean formation comprises circulating the well drill-in and servicing fluid through a drill pipe and drill bit in contact with the formation.

21. The method of claim 1 wherein permitting the filter cake to degrade at a desired time comprises:

allowing the delayed-release acid component to release an acid;

allowing the initiator component to interact with the released acid to produce hydrogen peroxide;

allowing the released acid to degrade at least a portion of the inorganic portion of the filter cake after a desired delay; and allowing the hydrogen peroxide to degrade at least a portion of the organic portion of the filter cake.

22. A method of degrading a filter cake in a subterranean formation, the filter cake comprising an inorganic portion and an organic portion, and having been established in the formation by a well drill-in and servicing fluid that comprises a delayed-release acid component, the method comprising:

permitting the delayed-release acid component to release an acid, wherein the delayed-release acid component comprises at least one component selected from the group consisting of an ortho ester and a poly(ortho ester), wherein the delayed-release acid component is present in the well drill-in and servicing fluid in an amount in the range of from about 1% to about 40% by weight;

contacting the filter cake with an initiator component separate from the well drill-in and servicing fluid;

permitting the initiator component to interact with the released acid to produce an oxidizer;

allowing the released acid to degrade at least a portion of the inorganic portion of the filter cake; and allowing the oxidizer to degrade at least a portion of the organic portion of the filter cake.

23. The method of claim 22 wherein the initiator component comprises lactate oxidase.

24. The method of claim 22 wherein the oxidizer comprises hydrogen peroxide.

25. The method of claim 22 wherein the delayed-release acid component further comprises at least one acid derivative selected from the group consisting of: an ester; an aliphatic polyester; a lactide; a poly(lactide); a glycolide; a poly(glycolide); a lactone; a poly($\epsilon$-caprolactone); a poly(hydroxybutyrate); an anhydride; a poly(anhydride); a poly(amino acid); an esterase enzyme; and any derivative thereof.

26. The method of claim 22 wherein the delayed-release acid component comprises a blend of poly(lactic acid) and an ortho ester.

* * * * *

UNITED STATES PATENT AND TRADEMARK OFFICE

CERTIFICATE OF CORRECTION

PATENT NO. : 7,648,946 B2
APPLICATION NO. : 10/991228
DATED : January 19, 2010
INVENTOR(S) : Trinidad Munoz, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-third Day of November, 2010

David J. Kappos
*Director of the United States Patent and Trademark Office*